(12) United States Patent
Westerlund

(10) Patent No.: US 6,756,090 B1
(45) Date of Patent: Jun. 29, 2004

(54) LOAD-BEARING MEMBER OF REINFORCED THERMOPLASTIC

(75) Inventor: Gunnar Westerlund, Kungälv (SE)

(73) Assignee: Volvo Personvagnar AB (SE)

( * ) Notice: Subject to any disclaimer, the term of this patent is extended or adjusted under 35 U.S.C. 154(b) by 0 days.

(21) Appl. No.: 09/423,679

(22) PCT Filed: Apr. 28, 1998

(86) PCT No.: PCT/SE98/00769
§ 371 (c)(1),
(2), (4) Date: Feb. 4, 2000

(87) PCT Pub. No.: WO98/51473
PCT Pub. Date: Nov. 19, 1998

(30) Foreign Application Priority Data

May 12, 1997  (SE) ............................................... 9701764

(51) Int. Cl.$^7$ ............................................... B29C 51/14
(52) U.S. Cl. ...................... 428/34.1; 264/257; 264/258; 264/511; 264/571; 425/143
(58) Field of Search .............................. 428/36.3, 34.1; 425/143; 264/257, 511, 258, 571

(56) References Cited

U.S. PATENT DOCUMENTS 4,637,909 A * 1/1987 Lucca ........................ 264/510
4,908,251 A * 3/1990 Iimura et al. ................. 428/68
5,139,407 A * 8/1992 Kim et al. ............. 425/174.8 E
6,261,392 B1 * 7/2001 Sundgren et al. ........... 148/590

FOREIGN PATENT DOCUMENTS

EP          0 545 055 A1     6/1993

* cited by examiner

Primary Examiner—Sandra M. Nolan
(74) Attorney, Agent, or Firm—Lerner, David, Littenberg, Krumholz & Mentlik, LLP

(57) ABSTRACT

Apparatus is disclosed for molding a load-bearing element of reinforced thermoplastic material provided from a material charge including a thermoplastic matrix material of a non-permeable plastic membrane and a reinforcement material, the apparatus including a molding tool having first and second molding surfaces which are juxtaposed in a closed molding position producing at least one internal cavity having dimensions corresponding to the load-bearing element, a heater for heating the matrix material to a temperature above its softening temperature, a pressurizer for providing a pressure or vacuum force to urge the matrix material against at least one of the molding surfaces with the reinforcement material therebetween in order to urge the reinforcement material against one of the first and second molding surfaces to mold and consolidate the material charge. Methods for molding these load-bearing elements and novel load-bearing elements themselves are also disclosed.

5 Claims, 3 Drawing Sheets

LOAD-BEARING MEMBER OF REINFORCED THERMOPLASTIC

FIELD OF THE INVENTION

The present invention relates to apparatus and a method for the molding of a load-bearing element made of reinforced thermoplastic, and to one such load-bearing element.

The present invention relates to the technical fields of thermoforming of so-called sandwich elements, and the blow-molding of hollow bodies made of reinforced thermoplastic. The present invention uses thermoplastic layers in a material charge as a plastic membrane which, upon internal pressurization or external vacuum generation, is non-permeable. With the aid of pneumatics and/or hydraulics, the plastic membrane provides a molding force, in the direction towards the internal surfaces of a molding tool, on reinforcement material which lies between the plastic membrane and the internal walls of the molding tool. By heating the thermoplastic matrix material, either before or during molding, to a temperature exceeding the softening temperature, a material charge can be molded and consolidated inside the molding tool in order to provide a load-bearing element made of reinforced thermoplastic.

Load-bearing elements according to the present invention are advantageously used for load-bearing components in vehicles, but they can also be used for other applications where low weight and high rigidity are required.

BACKGROUND OF THE INVENTION

At present, it is normal for load-bearing components, such as for motor vehicles, to be made from fiber-reinforced thermoplastics. In this connection, use is often made of so-called GMT technology, which involves a material charge with reinforcement material and thermoplastic matrix material being molded by compression molding during heating (thermoforming) in a two-part molding tool.

According to the prior art such a molding tool comprises a number of tool components which can be maneuvered so that the molding tool can be opened and closed. The tool components of the molding tool are additionally arranged so as to be able to apply an external compression force on the material charge which is located inside a cavity inside the molding tool. Moreover, the tool components are provided with guide pins or the like for achieving a good fit between the tool components during compression.

During compression molding, according to the prior art, the thermoplastic matrix material is preheated, with the aid of separate heating means, to the softening temperature or melt temperature of the thermoplastic matrix material.

In the prior art, the material charge sometimes has the form of a so-called preform, which is produced in a separate stage. The preform can be produced, for example, by coating a preforming screen, having a shape which is approximately similar to the final component, with cut roving or other glass fiber material and a suitable binder for holding the reinforcement in place. A precondition of GMT technology is that a thermoplastic matrix material is also present.

The previously known GMT technology requires the use of molding tools which, for example with the aid of hydraulic means, exert a pressure from outside onto the material layers which are to be molded. GMT technology uses a fairly large amount of energy and is less well suited for the manufacture of objects having the lowest possible weight.

Another previously known technique for the molding of components which comprise thermoplastics is blow-molding. In this connection, the raw material is plasticized in an extruder and is formed into a tubular blank which is engaged over a blow nozzle and enclosed in a mold consisting of two concave halves, after which the raw material is blown up and pressed against the cooled walls of the mold cavity and set. This technique has previously been used for the production of light thermoplastic hollow bodies without reinforcement, which hollow bodies therefore have a relatively low degree of wall rigidity.

Thus, a first object of the present invention is to make available an arrangement for molding a load-bearing element of reinforced thermoplastic in an energy-saving manner.

SUMMARY OF THE INVENTION

In accordance with the present invention, this and other objects have now been realized by the invention of apparatus for molding a load-bearing element comprising reinforced thermoplastic material provided from a material charge comprising at least one layer of thermoplastic matrix material comprising a non-permeable plastic membrane having a predetermined softening temperature and a reinforcement material, the apparatus comprising a molding tool including a first molding surface and a second molding surface whereby when the first and second molding surfaces are juxtaposed in a closed molding position at least one internal cavity having dimensions corresponding to the load-bearing element is formed therebetween, means for urging the first and second molding surfaces into the closed molding position, heating means for heating the matrix material to a temperature above the predetermined softening temperature, and matrix material molding means for providing a pressure or vacuum force for urging the matrix material against at least one of the first and second molding surfaces with the reinforcement material therebetween to thereby urge the reinforcement material against the at least one of the first and second molding surfaces to mold and consolidate the material charge. In a preferred embodiment, the matrix material molding means provides the force by pneumatic or hydraulic pressure.

In accordance with one embodiment of the apparatus of the present invention, the matrix material molding means provides the force in the form of a pneumatic vacuum.

In accordance with another embodiment of the apparatus of the present invention, the first and second molding surfaces are juxtaposed to provide a molding force onto selected areas of the material charge when in the closed molding position.

In accordance with another embodiment of the apparatus of the present invention, the apparatus includes cooling means disposed within the molding tool. In another embodiment, the apparatus includes heating means disposed within the molding tool.

In accordance with another embodiment of the apparatus of the present invention, at least one of the first and second molding surfaces includes compressing means for compressing predetermined regions of the material charge so as to provide a plurality of internal cavities between the predetermined regions and to provide compressed regions of the material charge including the non-permeable plastic membrane.

In accordance with the present invention, a method has also been devised for molding a load-bearing element comprising providing a molding tool including a first molding surface and a second molding surface forming a closed molding position when the first and second molding surfaces are juxtaposed against each other, introducing a material charge between the first and second molding surfaces comprising at least one layer of thermoplastic matrix material comprising a non-permeable plastic membrane having a predetermined softening temperature and a reinforcement material, with the reinforcement material disposed between the thermoplastic matrix material and at least one of the first and second molding surfaces, molding the material charge between the first and second molding surfaces with areas of the thermoplastic matrix material clamped within the molding tool to provide a seal, heating the material charge to an elevated temperature exceeding the predetermined softening temperature, providing pressure or vacuum force for urging the matrix material against the at least one of the first and second molding surfaces with the reinforcement material therebetween to mold and consolidate the material charge, and cooling the load-bearing element to a temperature below the predetermined softening temperature.

In accordance with one embodiment of the present invention, the at least one layer of thermoplastic matrix material and the reinforcement material are separate layers, whereby during providing of the pressure or vacuum force the at least one layer of thermoplastic matrix material can move with respect to the reinforcement material and thereby press the reinforcement material against the at least one of the first and second molding surfaces to facilitate the molding and consolidation of the material charge.

In accordance with a preferred embodiment, the heating of the material charge to the temperature greater than the predetermined softening temperature comprises heating the material charge to a temperature of between 180° C. and 250° C.

In accordance with one embodiment of the method of the present invention, cooling of the load-bearing element to the temperature below the predetermined softening temperature comprises cooling the load-bearing element to a temperature of less than 180° C.

In accordance with another embodiment of the method of the present invention, providing of the force comprises providing a pneumatic vacuum thereto.

In accordance with another embodiment of the method of the present invention, molding of the material charge includes exerting a molding force from at least one of the first and second molding surfaces against the material charge therewith.

In accordance with another embodiment of the method of the present invention, cooling of the load-bearing element includes cooling through the walls of the molding tool.

In accordance with another embodiment of the method of the present invention, heating of the material charge comprises heating through the walls of the molding tool.

In accordance with another embodiment of the method of the present invention, introducing of the material charge includes at least partially covering the surface of the matrix material with the reinforcement material comprising at least one sheet of a porous fibrous material between the matrix material and the at least one of the first and second molding surfaces.

In accordance with another embodiment of the method of the present invention, the molding tool has a predetermined cross-sectional area, and introducing of the material charge includes providing at least one layer of a film or foil of the matrix material having a surface area greater than the predetermined cross-sectional area of the molding tool, the matrix material comprising polypropylene, polyester, polybutylene terephthalate and polyamide.

In accordance with another embodiment of the method of the present invention, the method includes incorporating at least one additional load-bearing element in the material charge.

In accordance with another embodiment of the method of the present invention, the method includes compressing predetermined regions of the material charge so as to provide a plurality of internal cavities between the predetermined regions and compressed regions of the material charge at the predetermined regions including the non-permeable membrane.

In accordance with the present invention, a load-bearing element has also been provided comprising reinforced plastic including a thermoplastic matrix and reinforcement material simultaneously consolidated during a molding process wherein a plurality of layers of the reinforced plastic surround at least one cavity formed during the molding process by the application of a pressure or vacuum force on the thermoplastic matrix material in a heated state, the thermoplastic matrix material comprising a non-permeable plastic membrane which presses the reinforcement material against the surfaces of the molding tool during the molding process.

In a preferred embodiment, the load-bearing element comprises a first layer of the reinforced plastic and a second layer of the reinforced plastic, the first and second layers of the reinforced plastic being in contact with each other at at least one predetermined contact area and being separated from each other outside the at least one predetermined contact area, thereby forming solid consolidated layers of the reinforced plastic at the at least one predetermined contact area.

In accordance with one embodiment of the load-bearing element of the present invention, the plurality of layers of the reinforced plastic surround a plurality of cavities separated by compressed regions of the reinforced plastic.

In accordance with one embodiment of the load-bearing element of the present invention, the reinforcement material comprises reinforcement fibers, and the majority of the reinforcement fibers are oriented in the primary direction of expected stresses to be applied to the load-bearing element.

In accordance with another embodiment of the load-bearing element of the present invention, the reinforcement material comprises continuous fibers.

In accordance with another embodiment of the load-bearing element of the present invention, the reinforcement material comprises glass fibers.

In accordance with another embodiment of the load-bearing element of the present invention, the matrix material comprises a polymer such as polypropylene, polyester, polybutylene terephthalate and polyamide.

In accordance with another embodiment of the load-bearing element of the present invention, the load-bearing element includes additional load-bearing elements of the reinforced thermoplastic material incorporated therein.

In accordance with another embodiment of the load-bearing element of the present invention, the load-bearing element is incorporated in a component for a motor vehicle.

The objects of the present invention are achieved by means of the fact that the apparatus according to the present invention comprises a two-part molding tool whose internal walls, when the molding tool is in a closed position, form one or more internal cavities with dimensions corresponding to the external dimensions of a load-bearing element which is to be molded; by the fact that the apparatus further comprises means for fixing the molding tool in a closed position, and a material charge which comprises at least one layer of thermoplastic matrix material and reinforcement material; by the fact that the apparatus in this case comprises heating members arranged to heat the matrix material to a temperature which exceeds its softening temperature; by the fact that the apparatus is designed such that areas of the matrix material are clamped securely in the molding tool to provide a seal; and by the fact that the apparatus comprises a means which generates a molding force and which is arranged to act on the matrix material by pressurization and/or vacuum generation, the matrix material serving as a non-permeable, plastic membrane which is arranged to press the reinforcement material against the internal walls of the molding tool and thereby effect molding and consolidation of the material charge.

Another object of the present invention is to make available a method for energy-saving molding of a load-bearing element of reinforced thermoplastic using the apparatus according to the present invention.

This object is achieved by means of the fact that the method comprises opening a two-part molding tool, introducing a material charge with reinforcement material and at least one layer of thermoplastic matrix material, fixing the molding tool in a closed position surrounding the material charge, molding the material charge along the internal surfaces of the molding tool with the material charge at a temperature which exceeds the softening temperature of the matrix material, and opening the molding tool and, after cooling to a temperature below the softening temperature of the matrix material, removing a finished load-bearing element made of reinforced thermoplastic from the molding tool in an open position, by the fact that areas of the matrix material are clamped securely in the molding tool to provide a seal; and by the fact that a means for generating a molding force acts on the matrix material by pressurization and/or vacuum generation, the matrix material serving as a non-permeable, plastic membrane which presses the reinforcement material against the internal surfaces of the closed molding tool and thereby effects molding and consolidation of the material charge.

Another object of the present invention is to make available a load-bearing element of reinforced thermoplastic with high rigidity and low weight.

This object is achieved by means of the fact that the load-bearing element according to the present invention comprises reinforcement material and thermoplastic matrix material, the load-bearing element having been formed by molding and simultaneous consolidation of the reinforcement material and the matrix material; by the fact that layers of reinforced thermoplastic of the load-bearing element surround at least one cavity which has been formed during molding by applying an internal pressure and/or an external vacuum on the matrix material in a heated state, the matrix material having served during molding as a plastic membrane which is non-permeable upon pressurization or vacuum generation; and by the fact that the membrane during molding has pressed the outerlying reinforcement material against the internal surfaces of a surrounding molding tool.

According to the present invention, the matrix material and the reinforcement material are made available in the form of separate layers which, during molding, can move relatively freely in relation to one another, while the molding force is essentially generated with the aid of the means for generating a molding force. All in all, this means that relatively little energy is consumed in the molding operation.

Rigidity and load-bearing capacity can be optimized by means of the fact that the arrangement and method according to the present invention make it possible, for example, to arrange separate pieces of reinforcement material of the material charge in such a way that the reinforcement fibers run essentially in the direction in which the expected loads will have their direction of stressing in the load-bearing element.

Moreover, the weight of the load-bearing element can be optimized, while taking into consideration the rigidity and load-bearing capacity, by virtue of the cavities which, according to the present invention, can be created at suitable sites within the material structure.

BRIEF DESCRIPTION OF THE DRAWINGS

The present invention will more fully appreciated with reference to the following detailed description which, in turn, refers to the attached figures, in which.

DETAILED DESCRIPTION

A number of different embodiments of the present invention will now be described with reference to attached FIGS. 1 to 4.

Figure 1A:
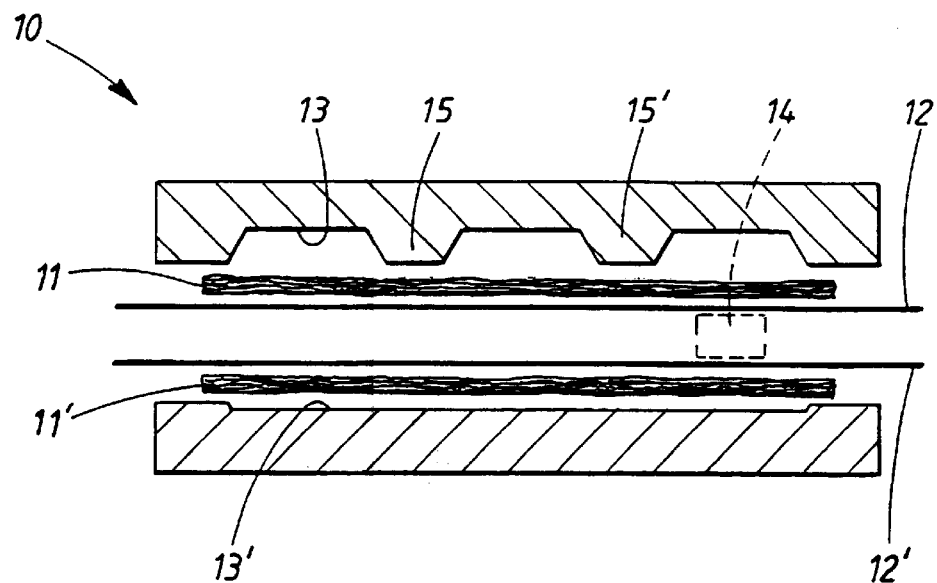
FIG. 1A is a side, elevational, diagrammatic, cross-sectional view of a first embodiment of apparatus according to the present invention, with a molding tool in an open position, and with a material charge placed in the molding tool.
Figure 1B:
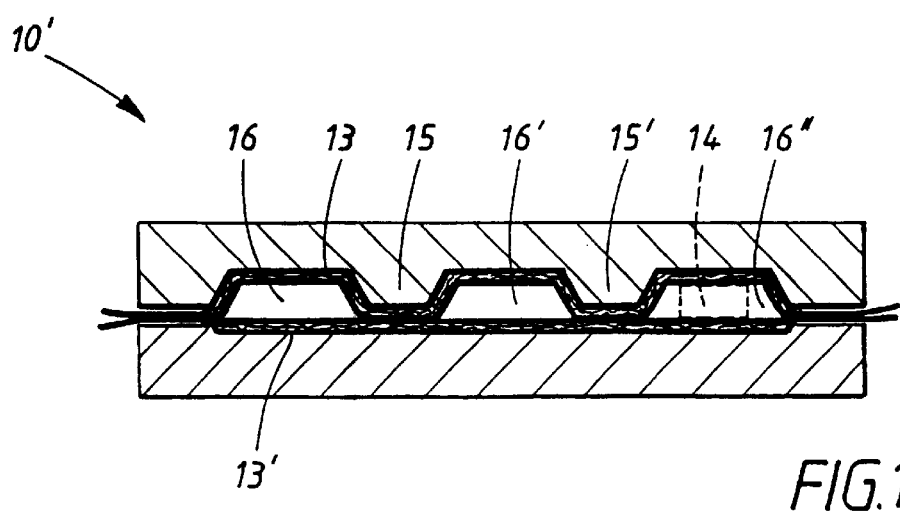
FIG. 1B is a side, elevational, diagrammatic, cross-sectional view of the molding tool from FIG. 1A, in a closed position during molding.
Figure 2:
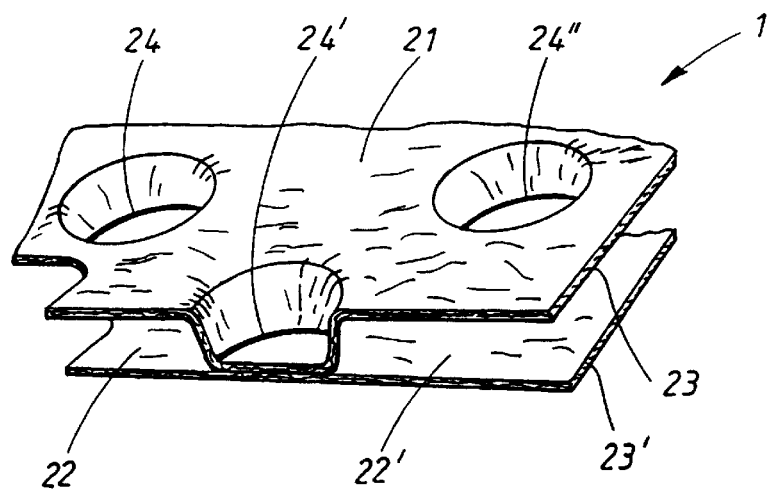
FIG. 2 is a top, perspective, diagrammatic, partially cross-sectional view of an area of a load-bearing element according to a first embodiment of the present invention.

We will begin by describing, with reference to FIGS. 1A, 1B and 2, a first preferred embodiment of a method, an apparatus and a load-bearing element according to the present invention.

In FIG. 1A, a molding tool 10 of an arrangement according to the present invention is shown in an open position. In the described embodiment, the molding tool 10 comprises two tool halves with internal walls, 13 and 13', which, when the molding tool 10' is in a closed position, form internal cavities having a shape which matches the external dimensions of the load-bearing element which is to be molded.

In other words, the dimensions of the mold cavity will essentially correspond to the external dimensions of a load-bearing element which is to be molded.

A material charge has been placed inside the molding tool 10, which material charge, in the described embodiment, comprises two sheets or layers of matrix material, 12, 12', and two layers of reinforcement material, 11, 11', which lie on top of each respective layer of matrix material, 12, 12'.

The two layers of matrix material, 12, 12', have a surface area which is greater than the cross-sectional area of the internal cavity when the molding tool is brought into a closed position, while the layers of reinforcement material have a surface area which essentially is accommodated in the internal cavity when the molding tool is brought into a closed position. Thus, the two layers of matrix material, 12, 12', at their outer edges, are locally clamped securely between the two working components of the molding tool 10' in order to provide a seal when the molding tool 10' is brought into a closed position for molding.

By contrast, most of the reinforcement material, 11, 11', is accommodated inside the molding tool 10' when this is in its closed position.

In the first embodiment, the two layers of matrix material, 12, 12', consist of polypropylene film, while the reinforcement material, 11, 11', consists of a woven glass fabric with continuous fibers. However, it is also possible to use reinforcement material which comprises cut reinforcement fibers.

The material charge, with its layers of reinforcement material, 11, 11', and matrix material, 12, 12', is heated to a temperature which exceeds the softening temperature of the matrix material, 12, 12'. In the described embodiment, the material charge is therefore preheated to approximately 180° C. with the aid of an IR arrangement according to the prior art, before the matrix material is placed in the molding tool 10. However, it is possible for the matrix material to be heated in any suitable way according to the prior art.

After the heated material charge has been placed in the open molding tool 10, either manually or automatically according to the prior art, the molding tool 10 is brought into a closed position, as is shown in FIG. 1B, using suitable movement means (not shown) according to a technique familiar to the skilled person. The two halves of the molding tool 10' are thus brought into close contact with each other around the entire periphery of the internal cavity of the molding tool, which, as has already been mentioned, has the effect that the two layers of matrix material, 12, 12', at their outer edges, are clamped securely between the tool halves of the closed molding tool 10' and thus provide a seal.

With the aid of means 14 for generating a molding force (indicated by dashed lines in FIGS. 1A and 1B), which means, in the described embodiment, consist of a compressed air supply, a pneumatic pressure is created between the two clamped layers of heated matrix material, i.e. the polypropylene films.

The pressurization between the two layers of heated matrix material, 12, 12', has the effect that the two layers function as a plastic membrane which, by stretching, presses the outer layers of reinforcement material, 11, 11', against the internal surfaces, 13, 13', of the closed molding tool 10'. Consolidation and molding of the material charge inside the molding tool is thus achieved, the thermoplastic matrix material, after cooling, binding, the reinforcement material together by means of thermal bonds in order to form the layers of reinforced plastic which constitute the wall material of the load-bearing element according to the present invention.

In the described first embodiment, during molding, a molding force is also applied from the outside in those areas, 15, 15', where the internal walls, 13, 13', of the molding tool, 10, 10', are of such a design that the interspace between the walls, 13, 13', is locally smaller than the thickness of the interposed material charge. In the described embodiment, the molding force acting from the outside is generated by means of hydraulic pistons acting on the tool halves, although other means according to the prior art are also conceivable.

Thus, in the previously mentioned areas, 15, 15', of the molding tool, 10, 10', there will also be a molding force exerted from the outside and this will give rise locally to a compact, consolidated area of reinforced plastic in the product which is molded, i.e. the load-bearing element according to the present invention.

This is illustrated in FIG. 2, which diagrammatically shows an area of a load-bearing element 1 according to the first embodiment of the present invention, the load-bearing element 1 having three of these compact, consolidated regions or wall areas of reinforced plastic, in association with the depressions, 24, 24', and 24".

In the regions where the molding force has been directed from the inside and outwards by virtue of the previously mentioned means for generating a molding force, the load-bearing element 1 has, by contrast, internal cavities, 22, 22', formed by surrounding layers, 23, 23', of reinforced plastic molded and consolidated by the previously described internal pressurization with the matrix material in the heated state.

In the first embodiment of the present invention, use is made of a non-heated molding tool and of a preheated material charge. The consequence of this is that after molding and consolidation, the material charge cools relatively quickly in the molding tool to a temperature below the softening temperature of the thermoplastic matrix material. This permits short processing times, down to about 15 seconds.

After the temperature has fallen below the softening temperature of the matrix material, 12, 12', (FIGS. 1A and 1B), the molding tool, 10, 10', is opened and the molded and consolidated load-bearing element according to the present invention is removed and conveyed onwards for possible further working, for example grinding, painting or the like.

In the above-described first embodiment of the present invention, the load-bearing element can be the to be of a sandwich structure, with compact areas of reinforced plastic alternating with areas which comprise layers of reinforced plastic with hollow spaces interposed between them.

Figures 3A, 3B:
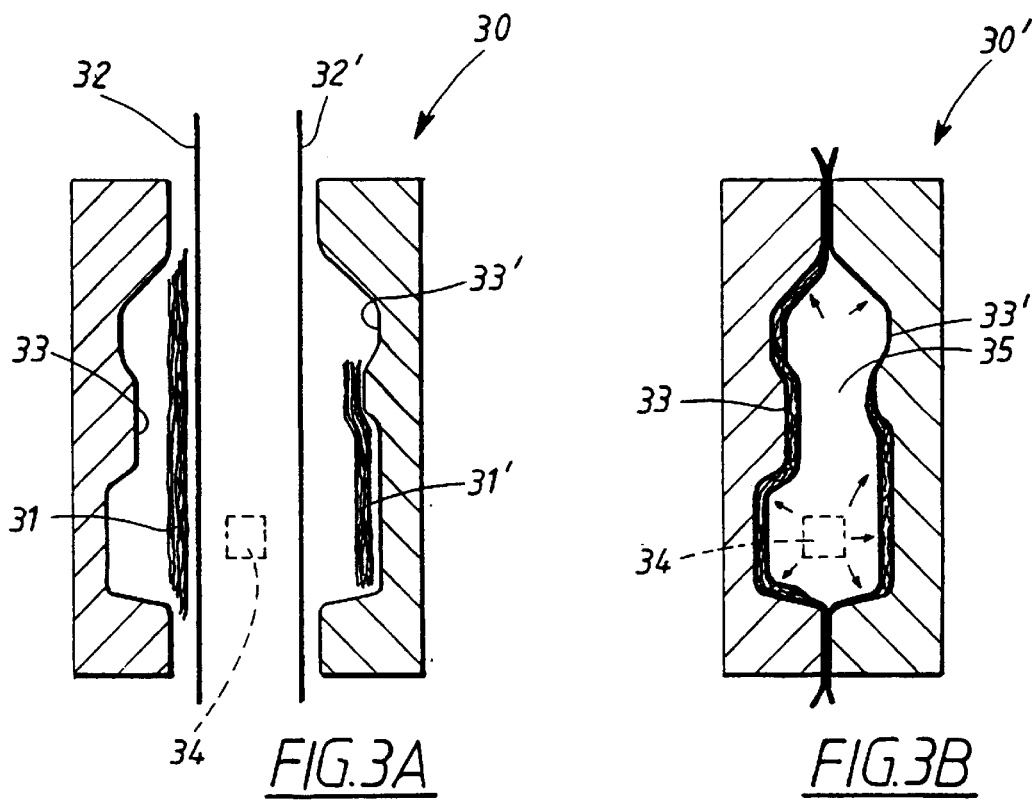
FIG. 3A is a front, elevational, diagrammatic, cross-sectional view of a molding tool, in an arrangement according to a second embodiment of the present invention, in an open position, and with a material charge placed in the molding tool.
FIG. 3B is a side, elevational, diagrammatic, cross-sectional view of the molding tool from FIG. 3A, in a closed position during molding.

FIGS. 3A and 3B illustrate a second embodiment of apparatus according to the present invention. The apparatus illustrated in FIGS. 3A and 3B is intended for producing load-bearing elements in the form of so-called hollow bodies by means of a method similar to the one described in connection with the first embodiment of the present invention. In the second embodiment, however, no molding pressure is exerted locally from the outside through the molding tool, instead the molding and consolidation take place exclusively with the aid of a means 34 for generating molding force, which means 34 has been indicated with dashed lines in FIGS. 3A and 3B.

Figure 4A:
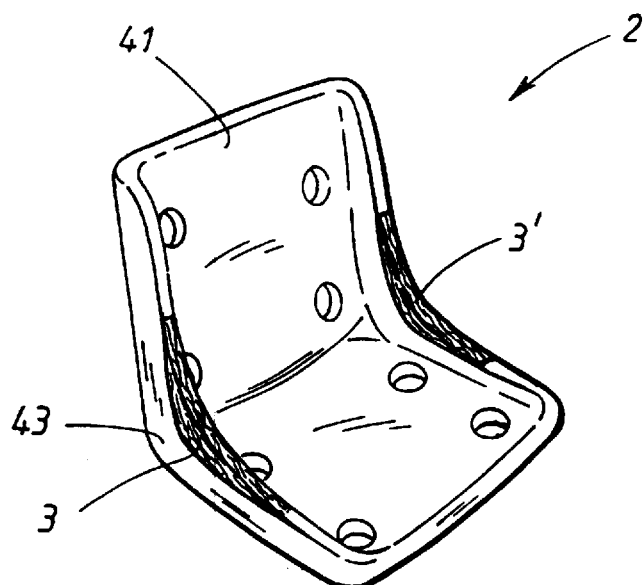
FIG. 4A is a side, perspective, diagrammatic, partially cut away view of a first load-bearing element according to the present invention in which two other load-bearing elements according to the present invention have also been incorporated for strengthening.
Figure 4B:
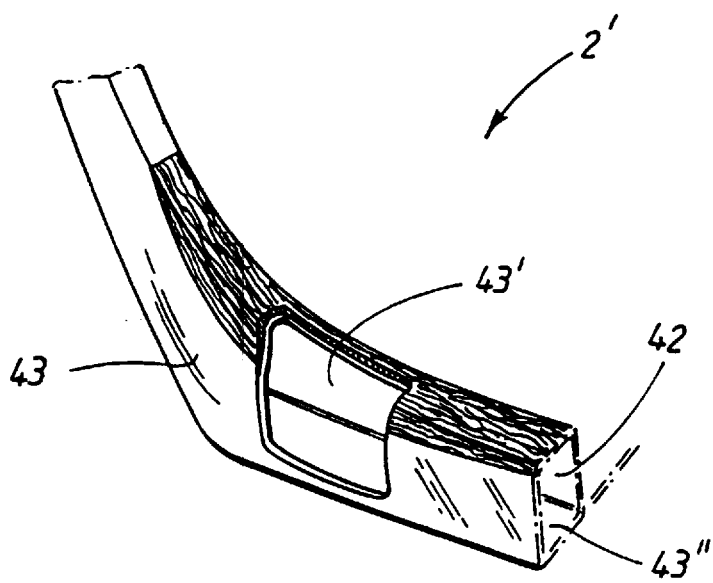
FIG. 4B is a side, perspective, diagrammatic, partial view of an area of the load-bearing element from FIG. 4A, in which a recess has been provided.

FIGS. 4A and 4B illustrate an advantageous application involving load-bearing elements according to the present invention. The application is a frame 2 for a vehicle seat, with high rigidity and low weight.

The frame 2 consists for the most part of a load-bearing element with a sandwich structure 41, according to the previously described first embodiment.

In the described application, the frame 2 additionally comprises strengthening members 3, 3' in the form of hollow bodies which have been molded according to the previously described second embodiment.

Preformed hollow bodies, 3, 3', which have been molded according to the previously described second embodiment, have in this case been fitted, in the material charge used in the final molding of the frame 2, with a sandwich structure according to the first embodiment.

The final result is a load-bearing element in the form of a frame, 2, 2', for a vehicle seat, as is shown in FIGS. 4A and 4B, in which the load-bearing element comprises both sandwich structures 41 and hollow bodies 3, 3', which have been molded according to preferred embodiments of the present invention.

The embodiments described here have been given only by way of example in order to better illustrate the invention. However, the present invention is not in any way limited to what has been described in conjunction with the various embodiments, nor to what is shown on the attached figures, and instead the scope of the invention is defined by the attached claims.

Thus, embodiments of the present invention are also possible in which the matrix material is provided in the form of a single layer, the pressurization then taking place between one half of the molding tool and the matrix material, with reinforcement material lying on top, instead of between several layers of matrix material, as previously described herein.

Embodiments of the present invention are also possible in which the matrix material comprises thermoplastic polymers other than polypropylene, for example polyester, PBT or polyamide, or mixtures of different thermoplastic polymers.

The choice of matrix material, as well as other processing factors, will of course influence the temperature which is necessary for achieving or exceeding the softening temperature of the thermoplastic matrix material. However, when implementing the invention, this temperature typically lies in the range of about 180° C. to 250° C.

Embodiments of the present invention are also possible in which the reinforcement material does not consist of a woven glass fabric with continuous fibers, but instead comprises other types of fibrous felt, cloth or knitted material.

The fibers in the reinforcement material do not necessarily need to be glass fibers, but can also comprise carbon fibers, other reinforcement fibers or mixtures of different reinforcement fibers. The reinforcement fibers can be discontinuous, but they are most advantageously continuous.

In the above-described embodiments of the present invention, a preheated material charge is used, or at least a preheated matrix material and a non-heated molding tool. However, embodiments of the present invention are also possible in which the matrix material is heated to its softening temperature inside the molding tool with the aid of heating members according to the prior art which are arranged in the walls of the molding tool.

It would also be possible to provide the molding tool with cooling means according to the prior art in order to obtain more rapid cooling of a preheated material charge after molding. Such cooling means are directly necessary in embodiments of the present invention in which the heating of the matrix material to the softening temperature takes place inside the molding tool, in order to achieve economically competitive processing times.

In the embodiments of the present invention which have been described above, the means for generating a molding force involves the delivery of compressed air from a compressed air compressor according to the prior art. However, embodiments of the present invention are also possible in which the means for generating a molding force acts by another type of pressurization or by vacuum which is applied from the outside (as viewed from the walls of the molding tool) with a vacuum pump according to the prior art. Combinations of vacuum and internal pressurization are also conceivable. It is also possible for the internal pressurization to be obtained hydraulically.

Load-bearing elements according to the present invention are advantageously used for large components in vehicle manufacture, for example in frames for vehicle seats or in floor areas.

However, many other applications are conceivable in which load-bearing elements according to the present invention can be advantageously used by virtue of their high rigidity and low weight.

A great many different combinations are possible in which one or more preformed load-bearing elements according to the present invention are integrated in other load-bearing elements according to the present invention, by means of one or more load-bearing elements, which have been molded in one or more preliminary molding stages, being placed in the desired position in connection with the material charge before the molding in a final molding stage.

Such incorporation of one or more load-bearing elements in the structure of further load-bearing elements is particularly advantageous when, for example, extra strengthening is necessary in areas especially exposed to loading, or in cases where, for example, finished ventilation ducts or conduits for wiring and the like are to be provided in a load-bearing element according to the present invention.

Among many advantageous combinations which may be mentioned, there is the incorporation of load-bearing elements in the form of hollow bodies in a load-bearing element with a sandwich structure. The reverse is also possible, i.e. incorporation of load-bearing elements in the form of sandwich beams in a load-bearing element in the form of a hollow body.

Finally, embodiments of the present invention are also possible in which only selected areas of the walls of a finished load-bearing element comprise reinforcement material, while other areas only comprise thermoplastic material.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for molding a load-bearing element comprising providing a molding tool including a first molding surface and a second molding surface forming a closed molding position when said first and second molding surfaces are juxtaposed against each other, introducing a material charge between said first and second molding surfaces comprising at least one layer of thermoplastic matrix material comprising a non-permeable plastic membrane having a predetermined softening temperature and a reinforcement material, with said reinforcement material disposed between said thermoplastic matrix material and at least one of said first and second molding surfaces, molding said material charge between said first and second molding surfaces with areas of said thermoplastic matrix material clamped within said molding tool to provide a seal, heating said material charge to an elevated temperature exceeding said predetermined softening temperature, providing pressure or vacuum force for urging said matrix material against said at least one of said first and second molding surfaces with said reinforcement material therebetween to mold and consolidate said material charge, and cooling said load-bearing element to a temperature below said predetermined softening temperature wherein at least one additional load-bearing element is incorporated in said material charge.

2. A load-bearing element comprising reinforced plastic including a thermoplastic matrix and reinforcement material simultaneously consolidated during a molding process wherein a plurality of layers of said reinforced plastic surround at least one cavity formed during said molding process by the application of a pressure or vacuum force on said thermoplastic matrix material in a heated state, said thermoplastic matrix material comprising a non-permeable plastic membrane which presses said reinforcement material against the surfaces of a molding tool during said molding process, wherein said load-bearing element includes a plurality of cavities formed during the molding process, each cavity forming a strengthening member of said load-bearing element.

3. An apparatus for molding a load-bearing element comprising reinforced thermoplastic material provided from a material charge comprising at least one layer of thermoplastic matrix material comprising a non-permeable plastic membrane having a predetermined softening temperature and a reinforcement material, said apparatus comprising a molding tool including a first molding surface and a second molding surface whereby when said first and second molding surfaces are juxtaposed in a closed molding position at least one internal cavity having dimensions corresponding to said load-bearing element is formed therebetween, means for urging said first and second molding surfaces into said closed molding position, heating means for heating said matrix material to a temperature above said predetermined softening temperature, and matrix material molding means for providing a pressure or vacuum force for urging said matrix material against at least one of said first and second molding surfaces with said reinforcement material therebetween to thereby urge said reinforcement material against said at least one of said first and second molding surfaces to mold and consolidate said material charge, wherein said at least one of said first and second molding surfaces includes compressing means for compressing predetermined regions of said material charge so as to provide a plurality of internal cavities between said predetermined regions and to provide compressed regions of said material charge including said non-permeable plastic membrane.

4. A method for molding a load-bearing element comprising providing a molding tool including a first molding surface and a second molding surface forming a closed molding position when said first and second molding surfaces are juxtaposed against each other, introducing a material charge between said first and second molding surfaces comprising at least one layer of thermoplastic matrix material comprising a non-permeable plastic membrane having a predetermined softening temperature and a reinforcement material, with said reinforcement material disposed between said thermoplastic matrix material and at least one of said first and second molding surfaces, molding said material charge between said first and second molding surfaces with areas of said thermoplastic matrix material clamped within said molding tool to provide a seal, heating said material charge to an elevated temperature exceeding said predetermined softening temperature, providing pressure or vacuum force for urging said matrix material against said at least one of said first and second molding surfaces with said reinforcement material therebetween to mold and consolidate said material charge, cooling said load-bearing element to a temperature below said predetermined softening temperature, and compressing predetermined regions of said material charge so as to provide a plurality of internal cavities between said predetermined regions and compressed regions of said material charge at said predetermined regions including said non-permeable membrane.

5. A load-bearing element comprising reinforced plastic including a thermoplastic matrix and reinforcement material simultaneously consolidated during a molding process wherein a plurality of layers of said reinforced plastic surround at least one cavity formed during said molding process by the application of a pressure or vacuum force on said thermoplastic matrix material in a heated state, said thermoplastic matrix material comprising a non-permeable plastic membrane which presses said reinforcement material against the surfaces of a molding tool during said molding process, wherein said plurality of layers of said reinforced plastic surround a plurality of cavities separated by compressed regions of said reinforced plastic.

* * * * *

UNITED STATES PATENT AND TRADEMARK OFFICE
CERTIFICATE OF CORRECTION

PATENT NO. : 6,756,090 B1
DATED : June 29, 2004
INVENTOR(S) : Gunnar Westerlund

It is certified that error appears in the above-identified patent and that said Letters Patent is hereby corrected as shown below:

Column 4,
Line 37, delete "In accordance with one embodiment of the load-bearing element of the present invention, the reinforcement material comprises reinforcement fibers, and the majority of the reinforcement fibers are oriented in the primary direction of expected stresses to be applied to the load-bearing element."

Signed and Sealed this

Eleventh Day of January, 2005

JON W. DUDAS
*Director of the United States Patent and Trademark Office*

UNITED STATES PATENT AND TRADEMARK OFFICE
CERTIFICATE OF CORRECTION

PATENT NO. : 6,756,090 B1
DATED : June 29, 2004
INVENTOR(S) : Gunnar Westerlund

It is certified that error appears in the above-identified patent and that said Letters Patent is hereby corrected as shown below:

Column 2,
Line 63, insert -- In accordance with another embodiment of the apparatus of the present invention, the reinforcement material comprises at least one sheet of porous fibrous material comprising glass fibers or filaments.
 In accordance with another embodiment of the apparatus of the present invention, the thermoplastic matrix material comprises a film or foil polypropylene, polyester, polybutlene terephthalate and polyamide --.

Column 4,
Line 37, delete "In accordance with one embodiment of the load-bearing element of the present invention, the reinforcement material comprises reinforcement fibers, and the majprity of the reinforcement fibers are oriented in the primary direction of expected stresses to be applied to the load-bearing element."

Signed and Sealed this

Twenty-eighth Day of June, 2005

JON W. DUDAS
*Director of the United States Patent and Trademark Office*